United States Patent [19]

Seidel

[11] 3,918,003

[45] Nov. 4, 1975

[54] COMBINED FEEDBACK AND FEEDFORWARD AUTOMATIC GAIN CONTROL

[75] Inventor: Harold Seidel, Warren, N.J.

[73] Assignee: Bell Telephone Laboratories, Inc., Murray Hill, N.J.

[22] Filed: Oct. 29, 1974

[21] Appl. No.: 518,510

[52] U.S. Cl. .................... 330/29; 330/52; 330/132; 330/136; 330/145

[51] Int. Cl.[2] .......................................... H03G 3/30

[58] Field of Search ....... 330/29, 52, 132, 136, 144, 330/145; 333/81 R

[56] References Cited

UNITED STATES PATENTS

| | | | |
|---|---|---|---|
| 2,757,245 | 7/1956 | Pihl | 330/144 |
| 2,930,987 | 3/1960 | Groce et al. | 330/136 |
| 3,668,533 | 6/1972 | Fish et al. | 328/168 |
| 3,673,492 | 6/1972 | Gibson | 333/81 R |

*Primary Examiner*—James B. Mullins
*Attorney, Agent, or Firm*—S. Sherman

[57] ABSTRACT

Automatic gain control (AGC) is achieved by means of combined feedforward and feedback means. The feedforward AGC controls the signal level in the main signal path. The feedback AGC stabilizes the signal level in the AGC circuit. The use of feedforward techniques permits the AGC system to respond rapidly notwithstanding the presence of a narrowband filter in the AGC circuit, where such filter is included to extract a reference signal from among the many signals present in the main signal path.

15 Claims, 11 Drawing Figures

COMBINED FEEDBACK AND FEEDFORWARD AUTOMATIC GAIN CONTROL

This invention relates to AGC circuits.

BACKGROUND OF THE INVENTION

In the conventional automatic gain control (AGC) circuit some component of the signal is sensed and then fed back to an earlier stage in the system in such a manner as to maintain the signal component at some preassigned level. In a simple narrowband system, the intermediate frequency signal is readily available and is typically used as the reference. In more complicated, broadband multiplexed systems, wherein a large number of groups of signals are simultaneously transmitted along a common wavepath, it is convenient to include a pilot signal for AGC purposes. This then requires that a narrowband filter be included in the AGC circuit in order to isolate and then recover the pilot signal from among the many other signals present.

The difficulty with such an arrangement resides in the fact that the inclusion of a narrowband filter introduces a time and phase delay in the AGC loop. When one considers that in a highly fedback system there can be as many as thirty or more transits of the AGC loop in order to reestablish the signal level as the strength of the reference signal changes, it becomes apparent that the accumulated time delay and phase shaft through such a loop places a limit upon the rapidity with which the conventional AGC system can respond. For example, a narrowband AGC loop could not respond rapidly enough to compensate for certain types of signal fading which are caused by atmospherics and which tend to occur very rapidly.

It is, accordingly, the broad object of the present invention to provide rapid, automatic gain control.

SUMMARY OF THE INVENTION

In accordance with the present invention, time and phase delay limitations of the prior art are avoided by employing a feedforward automatic gain control system. In such a system, a portion of the signal is extracted from the main signal path and filtered, if necessary, to extract the reference frequency signal. The latter is then used to generate an AGC signal which is fed forward in a manner to control the level of the signal in the main signal path. Because the AGC signal is fed forward, the AGC signal traverses the AGC circuit only once. Thus, not withstanding the fact that the AGC circuit may include a filter, there is no time and phase accumulation, as occurs in a narrowband feedback AGC system.

In order that the AGC circuit detector always operate at the same operating point, the AGC signal is also fed back to a variable attenuator located at the input end of the AGC circuit, following the filter. As such, any filter associated with the AGC circuit is not included within this local feedback loop. As a result, the feedback loop is relatively broadband and, hence, there is no significant accumulation of time and phase delay in the local feedback loop.

Thus, in summary, an automatic gain control circuit in accordance with the present invention incorporates both feedforward automatic gain control (FFAGC) and feedback automatic gain control (FBAGC) features. The FFAGC is used to control the signal level in the main signal path. The FBAGC is a local feature of the AGC circuit itself and is included to stabilize the signal level applied to the AGC circuit detector. By using a feedforward AGC arrangement for the main signal path, a local feedback AGC which excludes the filter, the potential deleterious effects of a filter, upon the speed with which the AGC circuit can respond, are substantially avoided.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
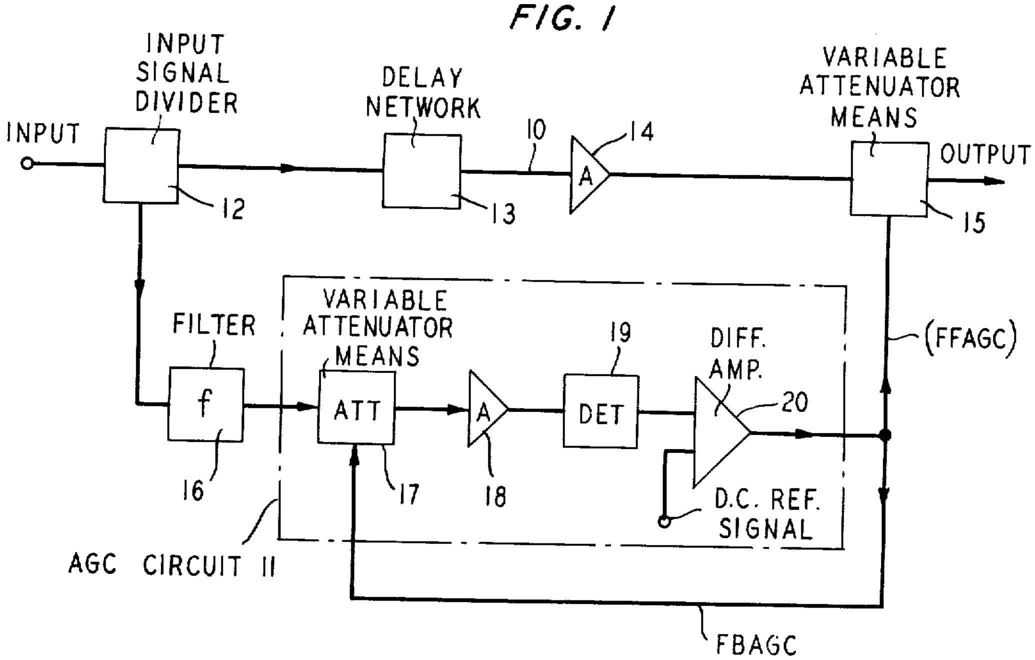
FIG. 1 shows an AGC circuit in accordance with the present invention.

Referring to the drawings, FIG. 1 shows a portion of an electromagnetic wave network including an AGC circuit in accordance with the present invention. The network includes a main signal path 10 and the associated AGC circuit 11. The main signal path 10 includes, in cascade, an input signal divider 12, a delay network 13, an amplifier 14, and variable attenuator means 15. The AGC circuit includes, in cascade, variable attenuator means 17, an amplifier 18, an amplitude detector 19, and a differential amplifier 20. One input port of differential amplifier 20 is connected to the output port of detector 19. The second input port of amplifier 20 is connected to a direct current reference signal derived from a d.c. voltage source, not shown.

The AGC signal produced by amplifier 20 is simultaneously fed forward to the control port of attenuator means 15, and fed back the control port of attenuator means 17 wherein it serves to vary the attenuation through these two attenuators as a function of the magnitude and sense of the AGC signal derived from differential amplifer 20.

Figure 2:
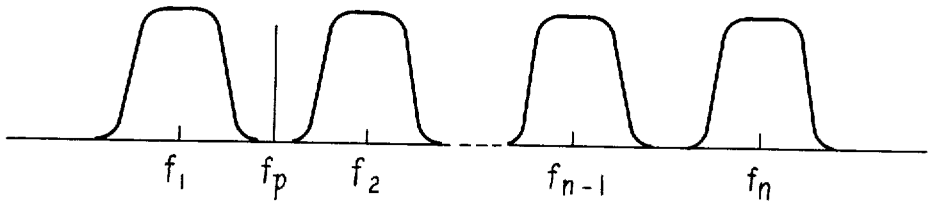
FIG. 2 shows the spectral distribution of a broadband communication system wherein the present invention is advantageously employed.

FIG. 2 shows the spectral distribution of a broadband communication system wherein the present invention is advantageously employed. Typically, in such a system a plurality of n channels, or groups of channels centered at frequencies $f_1, f_2 \ldots f_n$ are simultaneously transmitted along a common wavepath. Typically, some, or all of the channels are amplitude modulated, while some or all of the others are phase modulated. In any case, it is imperative that the amplitude variations impressed upon the signals are recognized as such and are distinguished from any spurious amplitude variations due to fading or the like. Accordingly, an unmodulated reference frequency signal, $f_p$, sometimes referred as a pilot signal, is simultaneously transmitted in one of the guard bands between a pair of adjacent channels, and is used as the reference against which the signal level is measured. Obviously, the first thing that must be done is to extract the pilot signal from among the others. Accordingly, a portion of the input signal applied to the main signal 10 is coupled out of the main signal path by means of signal divider 12 and is applied to a narrow passband filter 16 wherein the pilot signal is recovered. The latter is coupled to AGC circuit 11 wherein it is transmitted through attenuator 17 to amplifier 18, and hence to amplitude detector 19. At some specified reference level of pilot signal, the attenuation through attenuator 17 and the gain through amplifier 18 are such that the d.c. output from detector 19 is just equal to the d.c. reference signal. For this condition the AGC voltage at the output of differential amplifier 20 is zero, or some other d.c. reference level.

In the main signal path 10, all of the input signals are delayed by means of delay network 13 (so as to compensate both for the delay through filter 16 and for any delay experienced by the pilot signal as it is processed in the AGC circuit), and then amplified in amplifier 14. The amplified signals in path 10 are then attenuated some specified amount as they pass through attenuator means 15 to produce an output signal of some desired magnitude.

So long as the pilot signal level remains constant, variations in the level of the other signals are due to the amplitude modulation impressed upon them and are properly interpreted by the system as such. If, on the other hand, the general level of the signals tends to increase or decrease for other reasons, it is the function of the AGC circuit to sense these changes and to maintain the level of the output signals so that such spurious variations are not misinterpreted as a component of the amplitude modulation. For example, if the signals start to fade, the amplitude of the pilot signal will decrease, reducing the magnitude of the signal coupled to the differential amplifer by detector 19 to below that of the reference signal. As a result of this imbalance, a different AGC voltage is produced and fed forward to variable attenuator means 15 so as to reduce the net attenuation therethrough. This tends to increase the magnitude of the output signal, thus countering the tendency of the output signals to decrease as a consequence of the fading.

Because the AGC is fed forward, it is an open loop system and there is no mechanism for automatically determining whether or not the reduction in the attenuation is just enough to counter the fading. One could, of course, carefully design the attenuator to achieve this end. However, it will be noted that a diode, as would be typically used in detector 19, has a very nonlinear current-voltage characteristic. Hence, as the level of the pilot signal changes, and the diode operates at a different point along its current-voltage characteristic, the output from detector 19 will tend to vary nonlinearly unless some means is provided to stabilize its operating point. In the absence of such means, attenuator means 15 would have to be designed with this in mind and, in addition, the circuit would have to be calibrated regularly to be sure that the diode characteristic has not changed.

To avoid this complication, a local feedback AGC loop is provided by feeding the AGC signal back to attenuator 17 as well as forward to attenuator 15. Specifically, in the case of a fade, the feedback signal serves to reduce the attenuation through attenuator 17, thus increasing the net gain through the attenuator-amplifier combination preceeding detector 19. Conversely, if for any reason the pilot signal level tended to increase the detector output would tend to increase to a value greater than the reference signal. This would produce an AGC signal of the opposite sense which, when fed back, would increase the attenuation through attenuator 17 and decrease the net gain through the attenuator-amplifier preceding the detector. In either case, the local AGC feedback loop serves to establish and maintain an essentially constant level of signal at the input to the detector, thus substantially eliminating any problems associated with the nonlinearity of the diode characteristic.

Having thus stabilized the level of the pilot signal by means of the local FBAGC circuit, the level of the output signals in the main signal paths can then be similarly stabilized by making the attenuation characteristics of the two attenuators 15 and 17 identical, or, if not identical, by making them both linear over the operating range of interest but differing by only a constant factor.

In summary, by combining feedforward and feedback in an AGC circuit, a number of advantageous operating characteristics are obtained. Specifically, 1. by using feedforward AGC for the main signal path, time and phase delay buildup, due to the presence of the narrowband pilot signal filter in the AGC circuit, is avoided;

2. by using a local, broadband feedback loop in the AGC circuit, the effects of nonlinearities in the detector characteristics are eliminated without incurring substantial time and phase delay penalties;

3. by making the main signal path attenuator loss -vs- AGC voltage characteristic the same as the local AGC loop circuit attenuator characteristic, or by making them both linear over the operating range of interest, a substantially flat input-output main signal characteristic is obtained.

Because the main signal input-output characteristic is dependent solely upon the attenuator, the latter is advantageously designed to have invariable control relationships. That is, the attenuator is designed to have a highly stable control voltage -vs- attenuation characteristic that can be readily realized using only standard tolerance circuit components. For purposes of illustration, two such circuits will be disclosed hereinbelow. Both are designed to take advantage of the fact that the a.c. conductance of a diode is dependent solely upon the current through the diode. This can be readily illustrated.

As is known, the current I through a diode is given by $$I = Ae^{\frac{nqv}{kT}}, \qquad (1)$$

where v is the voltage across the diode;

$A$ and $n$ are constants which depend upon the material used and the manufacturing process employed;
$k$ is Boltzmanns constant;
$q$ is the charge of an electron; and
$t$ is the temperature.

The a.c. conductance g of a diode, i.e., the derivative of the current with respect to voltage, is given by $$g = \frac{dI}{dv} = \frac{nq}{kT} A \epsilon^{\frac{nqv}{kT}} \quad (2)$$

or $$g = \frac{nq}{kT} I = KI. \quad (3)$$

Thus, equation (3) states that the a.c. conductance is directly proportional to the current. The only other variable in the relationship is the temperature. However, since the only requirement on the AGC system is that both attenuators 15 and 17 be the same, changes in the diode conductance is not a problem so long as these changes are the same for both attenuators. This condition is readily satisfied regardless of temperature so long as both attenuators share the same local environment.

Figure 3:
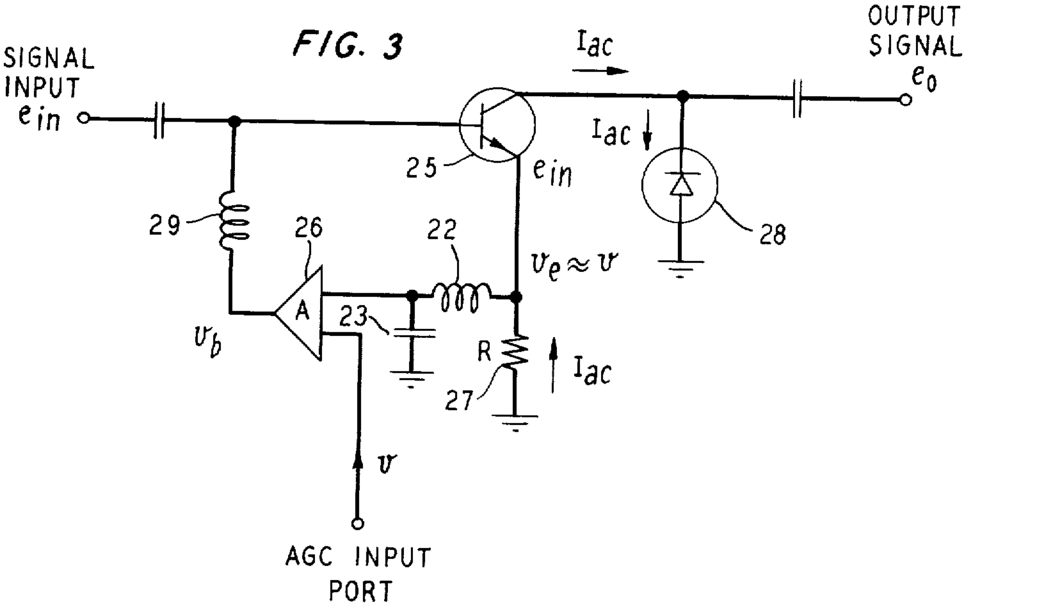
FIG. 3 shows a first illustrative embodiment of an attenuator for use with the present invention.

The first illustrative embodiment of an attenuator, in accordance with the present invention, is shown in FIG. 3. It comprises a transistor 25 connected in the common emitter configuration; a high gain differential amplifier 26; an emitter resistor 27; and a diode 28 which serves as the collector load. (To avoid unduly cluttering the drawing, the usual d.c. bias circuits are not shown.)

In operation, the AGC voltage $v$, produced by differential amplifier 20 in FIG. 1, is applied to one of the two input ports of differential amplifier 26. Simultaneously, the emitter voltage $v_e$ of transistor 25 is applied to the other differential amplifier input port through a low pass filter comprising a series inductor 22 and a shunt capacitor 23. The output voltage $v_b$ from amplifier 26 is, in turn fed back to the base electrode of transistor 25 through an inductor 29, to form a feedback loop which tends to keep the emitter voltage $v_e$ substantially equal to the AGC voltage $v$. This produces a d.c. current I through resistor 27 equal to $v/R$ which, in turn, causes a substantially equal d.c. collector current to flow through diode 28.

The transfer gain, $t$, experienced by an input signal $e_{in}$ applied to the attenuator is given as the ratio of the output signal $e_o$ to the input signal $e_{in}$. That is $$t = \frac{e_o}{e_{in}}. \quad (4)$$

The output signal $e_o$ is $$e_o = \frac{I_{ac}}{g}, \quad (5)$$

where
$I_{ac}$ is the collector signal current produced by input signal $e_{in}$, and
$g$ is the a.c. conductance of the diode.

Since the input signal voltage also appears across emitter resistor 27, the current $I_{ac}$ is given by $$I_{ac} = \frac{e_{in}}{R}. \quad (6)$$

Substituting from equation (6) for $I_{ac}$, and from equation (3) for q, equation (5) becomes $$e_o = \frac{\frac{e_{in}}{R}}{KI}. \quad (7)$$

When $e_o$ is substituted back into equation (4), the latter becomes $$t = \frac{1/R}{KI}. \quad (8)$$

Further noting that the d.c. emitter voltage $v_e$ is substantially equal to $v$, the d.c. current I is then $$I = \frac{v}{R}, \quad (9)$$

and equation (8) reduces to $$t = \frac{1}{Kv}. \quad (10)$$

Equation (10) states that, to a first order approximation, the gain through the attenuator is solely a function of the AGC voltage $v$ and the diode constant K. Thus, the use of this circuit for the attenuators 15 and 17 results in the two attenuators having exactly the same attenuation characteristic, which was one of the preferred circuit arrangements suggested hereinabove.

Figures 4, 5, 6:
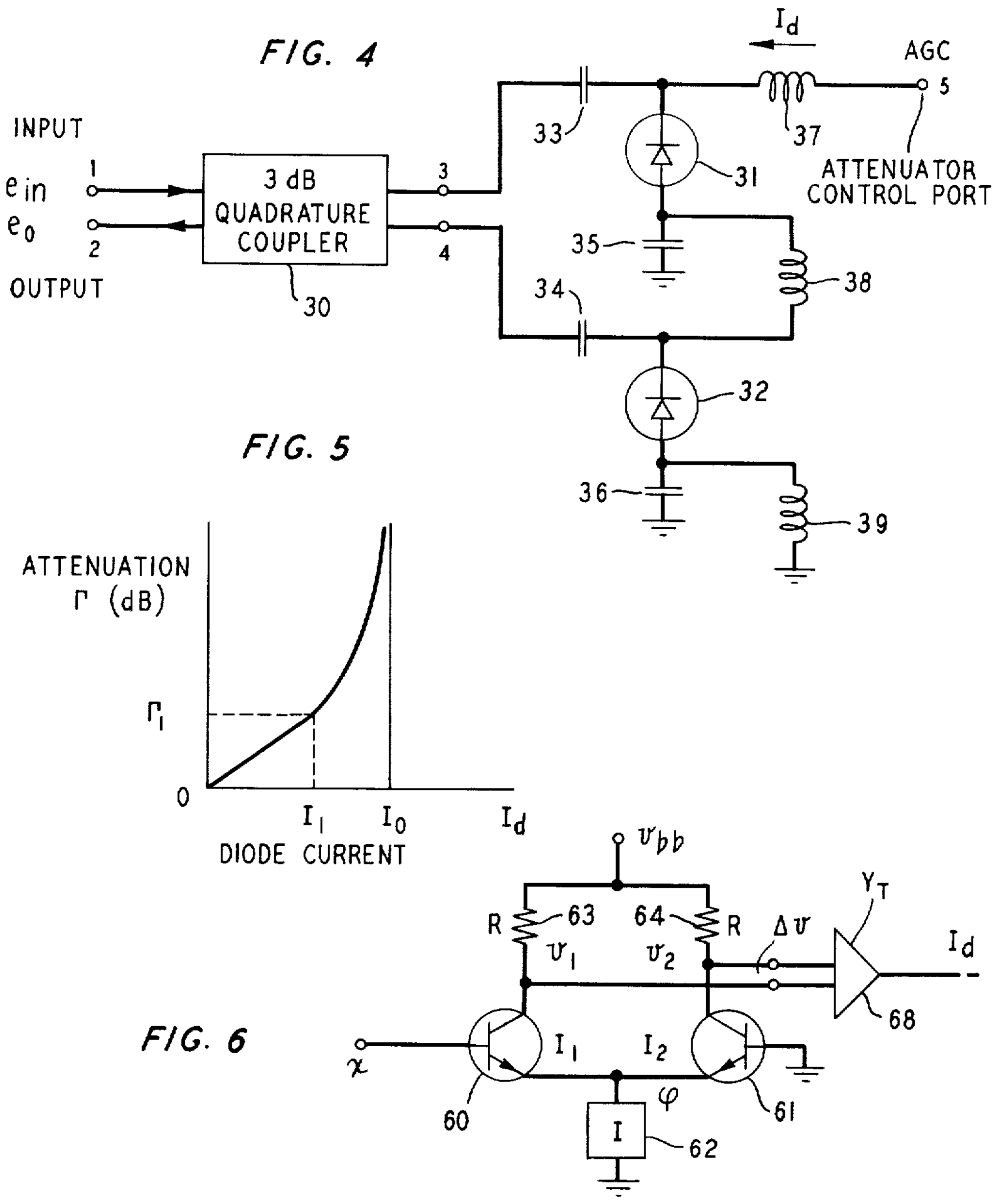
FIG. 4 shows a second embodiment of an attenuator for use with the present invention.
FIG. 5 shows the manner in which the attenuation of the attenuator of FIG. 4 varies as a function of diode current.
FIG. 6 shows a differential amplifier circuit.

FIG. 4, now to be considered, shows a second embodiment of an attenuator in accordance with the present invention, comprising a 3 dB quadrature coupler 30, and a pair of similar diodes 31 and 32. By similar, it is meant that they are made of the same materials and by the same process such that the constant $n$ for the two diodes is the same. However, they need not be a specially selected pair of diodes or matched in any sense.

With respect to a.c. signals, each diode is connected, respectively, to one port of one pair of conjugate ports of coupler 30. Designating the pairs of conjugate ports as 1–2 and 3–4, one electrode of diode 31 is connected to port 3 through a capacitor 33 and the other electrode is connected to ground through a second capacitor 35. Similarly, the same electrode of diode 32 is connected to port 4 through a capacitor 34 and the other electrode is connected to ground through a second capacitor 36.

With respect to d.c. currents, however, the two diodes are connected in series by means of an inductor 38. A pair of inductors 37 and 38 serve to isolate the a.c. and d.c. circuits.

Coupler port 1 serves as the attenuator input port, and port 2 serves as the attenuator output port. One end 5 of inductor 37 constitutes the attenuator control port.

In operation, the AGC signal derived from differential amplifier 20 in FIG. 1 is applied to the attenuator control port 5, causing a current $I_d$ to flow through the two series-connected diodes. Since the same current flows through both diodes, they have the same a.c. conductance g, as given by equation (3).

An input a.c. signal $e_{in}$, applied to input port 1 is divided into two equal components in ports 3 and 4. Each signal component, upon impinging upon one of the diodes is partially absorbed and particularly reflected. The two reflected components are recombined to produce an output signal $e_o$ in port 2, where $$e_o = e_{in}\Gamma . \quad (11)$$

Γ is the diode coefficient of reflection given by $$\Gamma = \frac{1-gR_o}{1+gR_o} . \quad (12)$$

and $R_o$ is the characteristic impedance of the signal circuit and coupler.

Substituting for $g$ from equation (3), we obtain that $$\Gamma = \frac{1-KI_dR_o}{1+KI_dR_o} , \quad (13)$$

which states that the reflection coefficient Γ and, hence, the attenuation through the attenuator is a function solely of the diode current $I_d$, and the constants $K$ and $R_o$.

It will be noted that in both attenuator embodiments, the atttenuation characteristics are not dependent upon any special components, nor on any special relationship among components. Thus, these circuits can be readily realized using standard, off-the-shelf parts.

Whereas the attenuation (i.e. the reciprocal of the transfer gain, $t$, ) of the attenuator illustrated in FIG. 3 varies as a linear function of the AGC voltage, the attenuation of the attenuator illustrated in FIG. 4 varies as a function of the AGC current in the manner illustrated in FIG. 5. In particular, at zero diode current, the reflection coefficient Γ is unity, and the attenuation is unity or, as shown on a logarithmetic scale, is zero dB. As the diode current increases, the attenuation increases in a substantially linear manner over a limited range. However, as the current approaches $I_o$, i.e., the current for which the diode conductance equals the reciprocal of the circuit impedance $R_o$, more of the input signal is absorbed by the diodes and, hence, the attenuation increases more rapidly. At $I_o$, the diodes form an impedance match, and the attenuation is infinite.

When an attenuator of the type illustrated in FIG. 4 is used in the local AGC circuit (i.e., attenuator 17) where only a single frequency signal is present, the principle parasitics can be readily tuned out and the maximum attenuation current $I_o$ readily defined. As such, the attenuator can be used over most of its range.

By contrast, attenuator 15 is located in a broadband wavepath and while the parasitics can be tuned out to some extent, it is not easy to do so such that the infinite attenuation current is the same for all frequencies. As a result, the attenuator of FIG. 4, when used in the main signal path 10, is advantageously operated over only the lower portion of the curve away from the high slope region. This, however, places a limit on the amount of attenuation that can be realized and, hence, would correspondingly limit the dynamic range of the AGC system. This would suggest using a number of such attenuators in cascade in the main signal path. However, as was indicated hereinabove, the overall attenuation characteristics of attenuators 15 and 17 are preferably identical or, if different, are both linear. Since the attenuator characteristic of FIG. 5 is obviously not linear, one could not use one attenuator in the local AGC circuit, and a plurality of the same attenuators in cascade in the main signal path, and end up with identical characteristics. This could be done, however, if both attenuators were, in some way, linearized over the operating range of interest.

If the attenuation in dB of the attenuator of FIG. 4 is to be a linear function of the AGC voltage $v$, Γ and $v$ must be related by $$\Gamma = e^{v} . \quad (14)$$

This, then, is the relation we would like to obtain to within some constant multiplier of $v$.

Substituting for Γ from equation (13) gives $$\frac{1-KR_oI_d}{1+KR_oI_d} = \epsilon^{v} \quad (15)$$

or $$KR_oI_d = \frac{1-\epsilon^{v}}{1+\epsilon^{+v}} . \quad (16)$$

Multiplying the numerator and denominator of the right-hand term by $e^{+v/2}$, equation (16) becomes $$KR_oI_d = \frac{\epsilon^{v/2}-\epsilon^{-v/2}}{\epsilon^{v/2}+\epsilon^{-v/2}} . \quad (17)$$

Substituting $q/k$T for $K$, and solving for $I_d$, we obtain $$I_d = \frac{kT}{qR_o} \tanh \frac{v}{2} . \quad (18)$$

Equation (18) states that the desired relationship between the reflection coefficient Γ and the AGC voltage $v$, as given by equation (14), is obtained if the diode current $I_d$ can be made to vary as the hypobolic tangent of the AGC voltage $v$. To this end, we now consider the differential amplifier circuit shown in FIG. 6 comprising transistors 60 and 61 connected in the common emitter configuration. More specifically, the emitters of both transistors are connected to a common high impedance current source 62, which will be considered in greater detail hereinbelow. The collector electrode of each transistor is connected to a a common d.c. voltage supply through one of two equal resistors 63 and 64. The base electrode of transistor 61 is grounded. The base of transistor 60 is the input port of the amplifier.

With an input voltage of $x = 0$ applied to the base of transistor 60, the emitter current $I$ divides equally between the two transistors, producing equal collector voltages $v_1$ and $v_2$. If, on the other hand, a finite voltage $x$ is applied to the base of transistor 60, current $I$ divides unequally between the two transistors. In particular, the two currents $I_1$ and $I_2$ are given by $$I_1 = C\epsilon^{\frac{q}{kT}(-\phi)} \quad (19$$

and $$I_2 = C\epsilon^{\frac{q}{kT}(-\phi)} \quad (20)$$

The total current I is $$I = C\epsilon^{\frac{-q\phi}{kT}}\left(\epsilon^{\frac{qx}{kT}} + 1\right). \quad (21)$$

The collector voltages $v_1$ and $v_2$ are $$v_1 = v_{bb} - I_1 R, \quad (22)$$

and $$v_2 = v_{bb} - I_2 R. \quad (23)$$

The differential output voltage $\Delta v$ is $$\Delta v = v_2 - v_1. \quad (24)$$

Substituting for $v_1$ and $v_2$ from equations (22) and (23), and for $I_1$ and $I_2$ from equations (19) and (20), equation (24) reduces to $$\Delta v = CR\epsilon^{\frac{-q\phi}{kT}}\left(\epsilon^{\frac{qx}{kT}} - 1\right). \quad (25)$$

Dividing $\Delta v$, given by equation (25), by $I$, given by equation (21), we obtain $$\frac{\Delta v}{I} = R\,\frac{\epsilon^{\frac{qx}{kT}} - 1}{\epsilon^{\frac{qx}{kT}} + 1}, \quad (26)$$

or $$\Delta v = RI \tanh \frac{q}{kT} \cdot \frac{x}{2}. \quad (27)$$

Equation (27) states that the differential output voltage $\Delta v$ of a differential amplifier varies as the hyperbolic tangent of the input voltage $x$. What we would like, however, is to have the diode current $I_d$ vary as the hyperbolic tangent of a voltage. Accordingly, the output voltage $\Delta v$ is converted to a current $I_d$ by means of a transconductor 68, whose input-output relationship in terms of its transconductance $Y_t$ is $$\Delta v = \frac{I}{Y_t}. \quad (28)$$

Substituting for $\Delta v$ in equation (27), and solving for $I_d$, gives $$I_d = Y_t RI \tanh \frac{q}{kT} \cdot \frac{x}{2}. \quad (29)$$

Comparing equations (29) and (18) we note that the functions are the same if $$Y_t RI = \frac{kT}{qR_o}, \quad (30)$$

and $$\frac{qx}{kT} = v. \quad (31)$$

Figure 7:
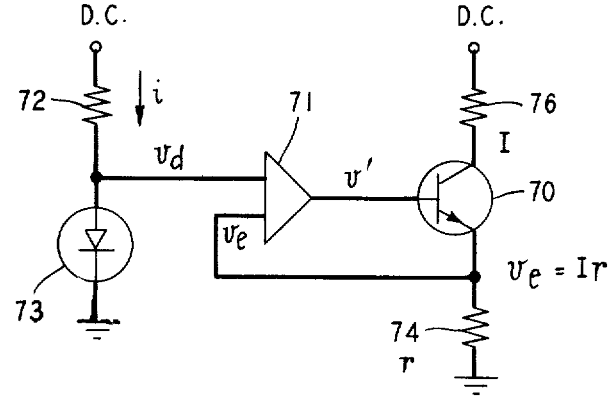
FIG. 7 shows a constant current source for use in the differential amplifier of FIG. 6 wherein the current varies as a linear function of temperature.

In equation (30), $Y_t$, $R$, $k$, $q$, $R$ and $R_o$ are all constants. Thus, equation (30) states that the emitter current *I varies as a linear function of the temperature T.* If it is anticipated that the AGC circuit will be maintained at a relatively constant operating temperature, the emitter current can be adjusted for this temperature. If, however, a variable ambient is anticipated, an adjustable current source is advantageously employed. One such arrangement, illustrated in FIG. 7, comprises a differential amplifier 71, a transistor 70, and a series circuit including a resistor 72 and a diode 73 connected between a d.c. voltage source and ground. One of the input ports of amplifier 71 is connected to the common junction of resistor 72 and diode 73. The other input port is connected between the emitter of transistor 70 and emitter resistor 74 which connects the transistor emitter to ground.

The output port of amplifier 71 is connected to the base of transistor 70. The transistor collector connects to a d.c. source through a collector load impedance 76.

In operation, a direct current $i$, flowing through the series resistor-diode circuit, produces a voltage $v_d$ across the diode where $$i = A\epsilon^{\frac{qv_d}{kT}}. \quad (32)$$

This voltage is applied to one of the amplifier input ports, The other input port is at voltage $v_e$ given by $$v_e = Ir, \quad (33)$$

where $I$ is the transistor current and $r$ is the resistance of resistor 74. In the quiescent state, $v_e$ is equal to $v_d$, so that the transistor current is, in fact, a linear function of the diode voltage $v_d$.

By making the resistance of resistor 72 much larger than the resistance of diode 73, the current $i$ is substantially independent of the diode impedance. Thus, if the temperature $T$ changes, the current $i$ remains substantially constant. However, in order to satisfy equation (32), the diode voltage must change proportionately with temperature. That is $$v_d \sim T. \quad (34)$$

Thus, if the temperature changes, $v_d$ also changes thereby producing a voltage imbalance between the two input voltages to amplifier 71. This results in an output voltage $v'$ which, in turn, cause a change in the transistor current $I$ sufficient to reestablish the equality between $v_d$ and $v_e$. Thus, the resulting transistor current $I$ varies as a linear function of the temperature $T$, as called for by equation (30).

Equation (31) also indicates a relationship that is a function of temperature. However, it will be noted that the temperature is a factor in the argument of the hyperbolic tangent function and, as such, any variation in temperature will only modify the slope of the attenuation function but not its shape. Since attenuator 15 in the local FBAGC circuit, and attenuator 17 in the FFAGC circuit will typically share the same ambient, they will tend to vary together and, for most applications, this variation will produce no adverse effects.

Figure 8:
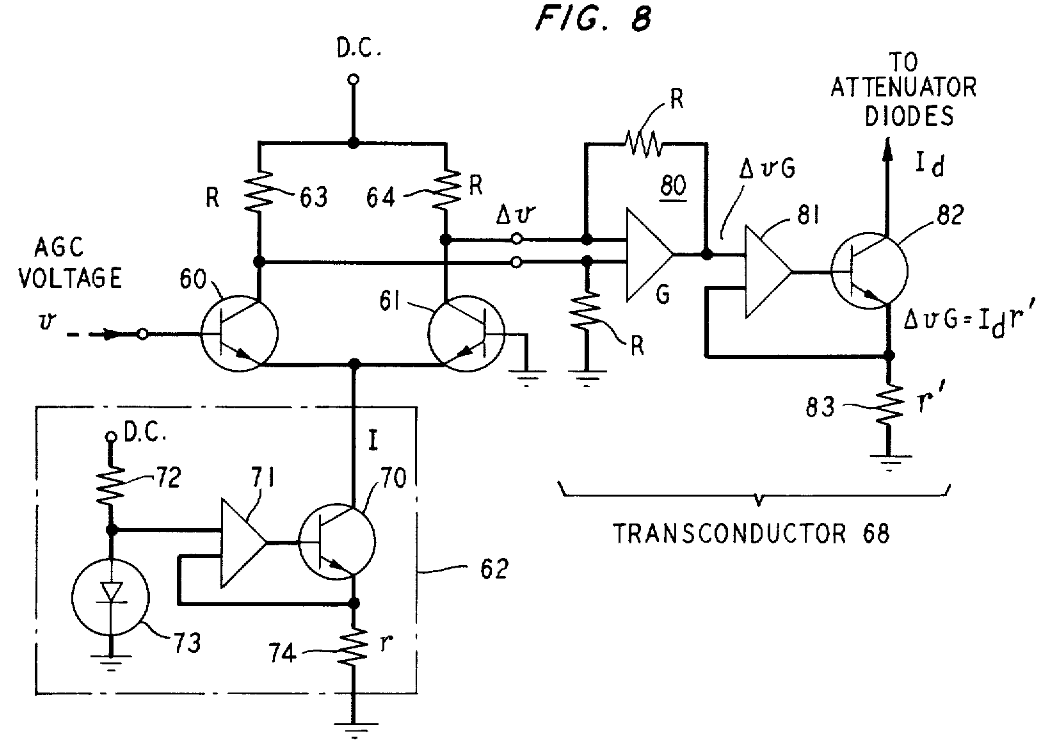
FIG. 8 shows a complete attenuator control circuit for linearizing the attenuator characteristic of the attenuator of FIG. 4.

FIG. 8, now to be considered, shows a complete attenuator control circuit for obtaining a linear attenuation (in dB) -vs- AGC voltage characteristic using the attenuator shown in FIG. 4. Using the same identification numerals to identify corresponding components, the control circuit comprises a differential amplifier of the type illustrated in FIG. 6; an emitter current source 62 of the type shown in FIG. 7; and a transconductor 68. The latter comprises an operational amplifier 80 for converting the differential output voltage $\Delta v$ to an unbalanced voltage $\Delta vG$, where $G$ is the amplifier gain; and a circuit including a differential amplifier 81, transistor 82 and resistor 83, for converting voltage $\Delta vG$ to a current $I_d$. Amplifier 81, transistor 82 and resistor 83 are connected in the same manner as amplifier 71, transistor 70 and resistor 74.

The output current $I_d$ from transistor 82, is applied to diodes 31 and 32 in FIG. 4. The result is to produce an attenuation which, in dB, is a linear function of the AGC voltage $v$ applied to the base of transistor 60.

Having established a linear relationship between attenuation and AGC voltage, a number of circuit modifications can be conveniently made to optimize overall performance. For example, it will be recalled that it was considered desirable to restrict the range of operation of the main signal path attenuator to along its linear portion. Referring once again to FIG. 5, this would include the region between zero diode current and some current $I_1$. Operation above $I_1$ and, in particular, near $I_0$ is advantageously avoided. Because of this limitation, the maximum attenuation that can be obtained in a single attenuator is $\Gamma_1$. This would appear to place an upper limit upon the dynamic range that can be realized by such means. However, because of the linear attenuation characteristic that can be realized using the attenuator control circuit of FIG. 8, it is now possible to cascade as many attenuators as necessary to realize any prescribed dynamic range. This gives rise to the first modification of the invention illustrated in FIG. 9. Basically, this circuit is the same as that shown in FIG. 1. The modifications include the addition of an attenuator control circuit 90 in the FBAGC loop, and the division of the single attenuator 15 in the main signal path 10 into a plurality of $n$ attenuators 15-1, 15-2 . . . 15-n. The AGC voltage $v$ is applied to the respective attenuators by means of a signal divider 95 and a plurality of $n$ separate attenuator control circuit 91-1, 91-2 . . . 91-n and appropriate delay networks 92-1, 92-2 . . . 92-n.

If the maximum attenuation to be obtained is P dB, and the maximum allowable attenuation per attenuator is $\Gamma_1$ dB, the number $n$ of attenuators to be used is $P/\Gamma_1$. (If the ration of $P$ to $\Gamma_1$ is not an integer, the next higher integral number of attenuators would, of course, be used.)

In operation, the AGC voltage $v$ is fed back directly to attenuator control circuit 90 to produce an attenuation $p$ through attenuator 17. Simultaneously, voltage $v$ is applied to divider 95. The resulting output voltage $v/n$ is fed forward to each of the control circuits 91-1, 91-2 . . . 91-n which, in turn, control the attenuation through the respective attenuators 15-1 . . . 15-n. The delay networks 92 compensate for the delay experienced by the signal as it traverses the several attenuator stages.

Because of the linear relationship between the applied AGC voltage and the attenuation in dB, each of the attenuators 15-1, 15-2 . . . 15-n produces $p/n$ dB of attenuation for an overall total of $p$ dB for the $n$ attenuators.

Figure 10:
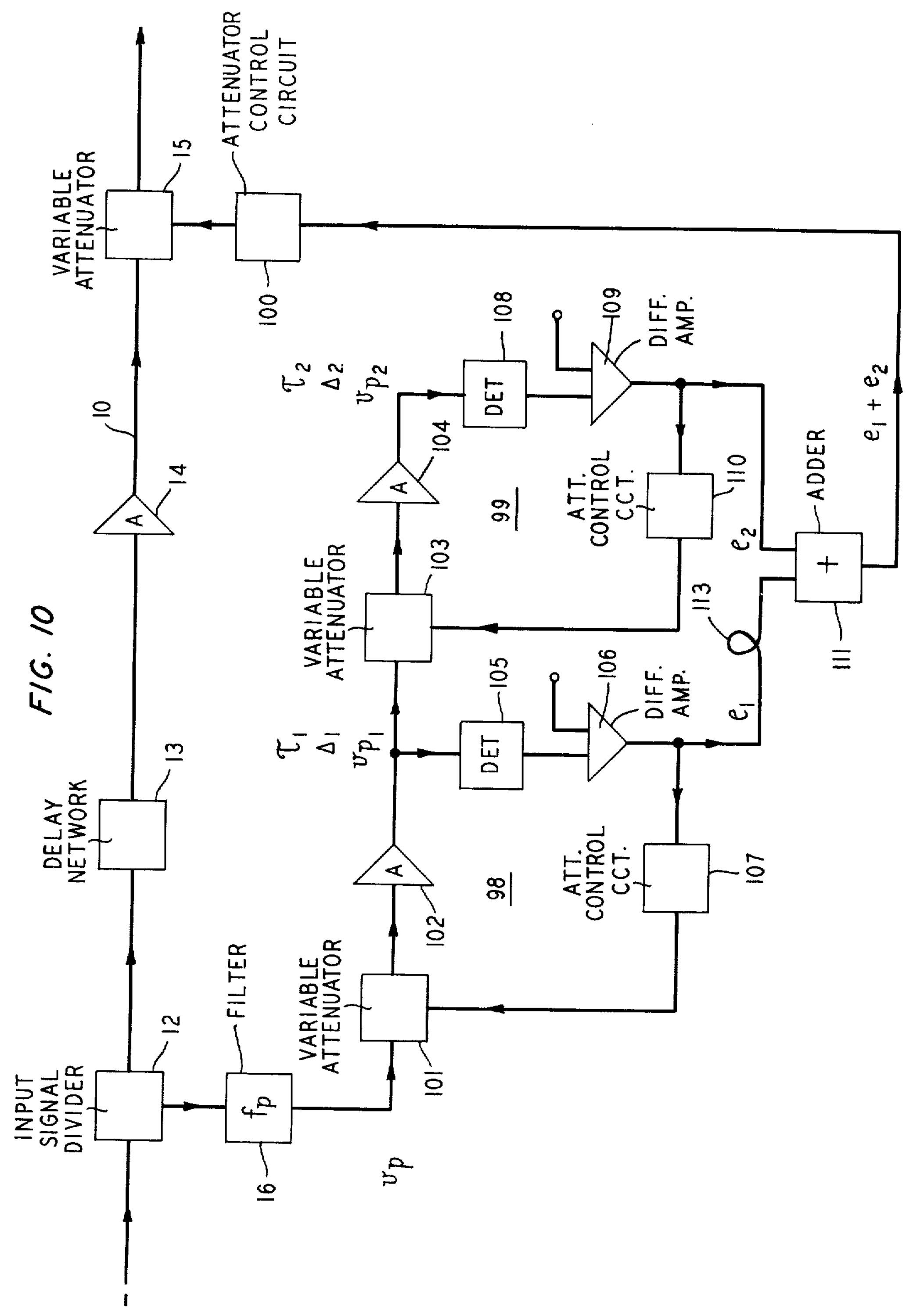
FIG. 10 shows a second modification of the AGC circuit of FIG. 1.

FIG. 10, now to be discussed, illustrates a second modification of the basic AGC circuit of FIG. 1 wherein a cascade of a plurality of local AGC loops is employed to reduce the total time delay through the AGC circuit. Recognizing that there will be some time delay through the AGC loop, a compensating time delay network 13 is included in the main signal wavepath 10. This insures that the variable attenuator 15 operates on the correct signal.

While a delay network can be readily constructed to provide any specified time delay, it will also be appreciated that as the time delay that must be provided increases, there is a corresponding increase in the loss through the delay network and an increase in the complexity and cost of the delay network. The circuit modification now to be described discloses one way to reduce this delay.

As is known in an AGC loop, the input-output characteristic is a function of the loop gain, Ideally, one would like a flat response wherein the output signal is constant, irrespective of the amplitude of the input signal. In practice, however, any AGC system will deviate from the ideal by an amount $\Delta$ which is inversely proportional to the loop gain $G$. That is, $$\Delta \sim 1/G . \qquad (35)$$

As is also well known, the bandwidth bw of a feedback control system is inversely proportional to the amplifier gain, $$bw \sim 1/G . \qquad (36)$$

From equation (35) and (36) we obtain that the error is proportional to the bandwidth, or $$\Delta \sim bw . \qquad (37)$$

However, bandwidth is inversely proportional to delay $\tau$, so that $$\Delta \sim 1/\tau . \qquad (38)$$

Equation (38) is merely another way of stating that in a highly fedback AGC system (i.e., high gain), the error is small and the delay is large. This would appear to suggest that for a specified error level, one must accept the corresponding delay. However, if one is willing to accept a degree of circuit complexity, of the type illustrated in FIG. 10, the delay can be significantly reduced. Specifically, what is done is to use a number of low gain feedback AGC circuits instead of one high gain circuit. For purposes of illustration and explanation, two FBAGC circuits 98 and 99 are employed. The first circuit 98 comprises variable attenuator 101, amplifier 102, detector 105, differential amplifier 106, and attenuator control circuit 107 arranged as in FIG. 1. The second circuit 99 comprises variable attenuator 103, amplifier 104, detector 108, differential amplifier 109, and attenuator control circuit 110, similarly connected. The two circuits are cascaded by connecting the output from amplifier 102 to the input of variable attenuator 103.

In operation, the output pilot signal from filter 16 is coupled to variable attenuator 101. The output signal from amplifier 102 is $v_{p1}$ which differs from what we would like by an amount $\Delta_1$. The delay through the loop is $\tau_1$.

Similarly, with $v_{p1}$ applied to attenuator 103, we obtain an output $v_{p2}$ from amplifier 104 which differs from the ideal by an amount $\Delta_2$. The delay through this circuit is $\tau_2$. The total error through the two circuits is $\Delta_1\Delta_2$, and the total delay is $\sigma_1 + \sigma_2$.

In order to appreciate the improvement that is realized, let us consider a numerical example. Let us assume that with a loop gain of 100, an error of 1 percent is obtained, and the delay is $\sigma$. Two such stages in cascade will result in an error of 0.01 percent, and a delay of 2 $\sigma$. To obtain the same error in a single stage would, from equation (39), result in a delay of 100 $\sigma$. Thus, by using two low gain stages instead of one high gain stage, a 50 fold reduction in delay is realized.

The two stages produce AGC voltages $e_1$ and $e_2$, respectively. Voltage $e_2$ is fed back to attenuator 101 through attenuator control circuit 107. Voltage $e_1$ is fed back to attenuator 103 through attenuator control circuit 110. These two AGC signals are also added together, in time coincidence, in an adder circuit 111 to produce a total AGC voltage $e_1+e_2$ which is applied to attenuator control circuit 100 which controls attenuator 15 in the main signal path. To add signals $e_1$ and $e_2$ in time coincidence, a delay network 113 is included in the $e_1$ signal path between amplifier 106 and adder 111 to compensate for the delay through the second AGC circuit 99.

Since the attenuation through each of the attenuators is a linear function of the applied AGC voltage, the attenuation produced by attenuator 15 in response to the sum of the AGC voltages $e_1$ and $e_2$, is the same as the sum of the attenuations produced by attenuators 101 and 103 in response to the respective AGC voltages $e_1$ and $e_2$.

Figure 9:
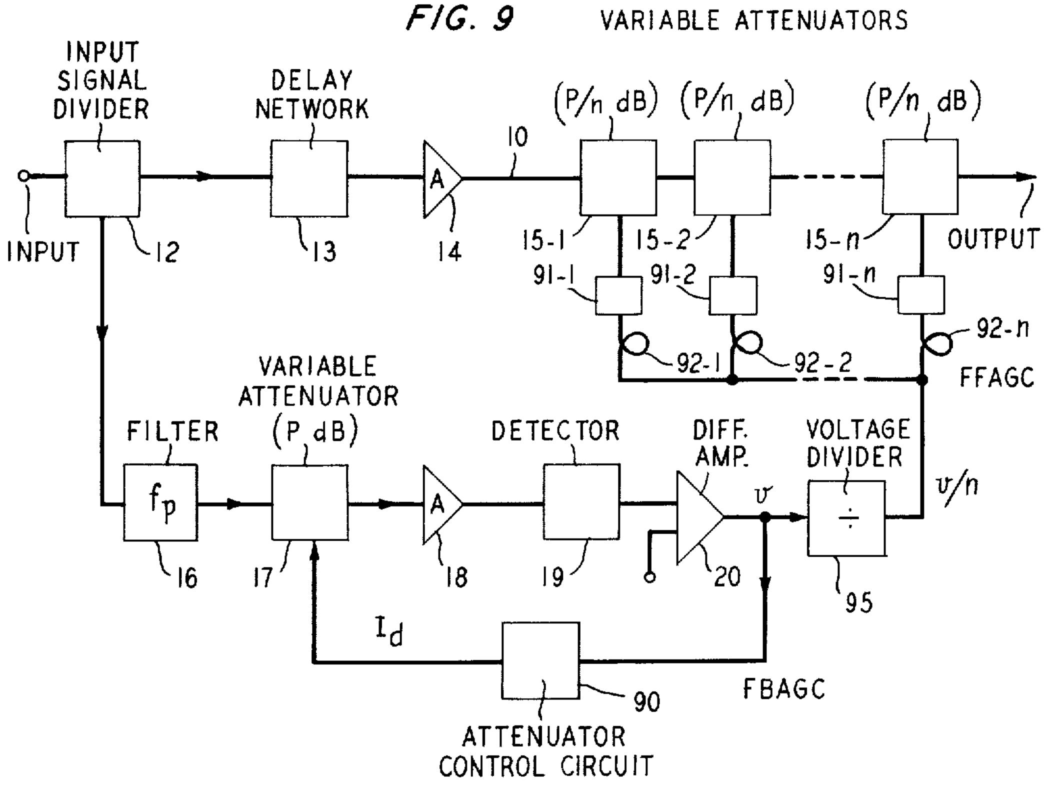
FIG. 9 shows a first modification of the AGC circuit of FIG. 1.
Figure 11:
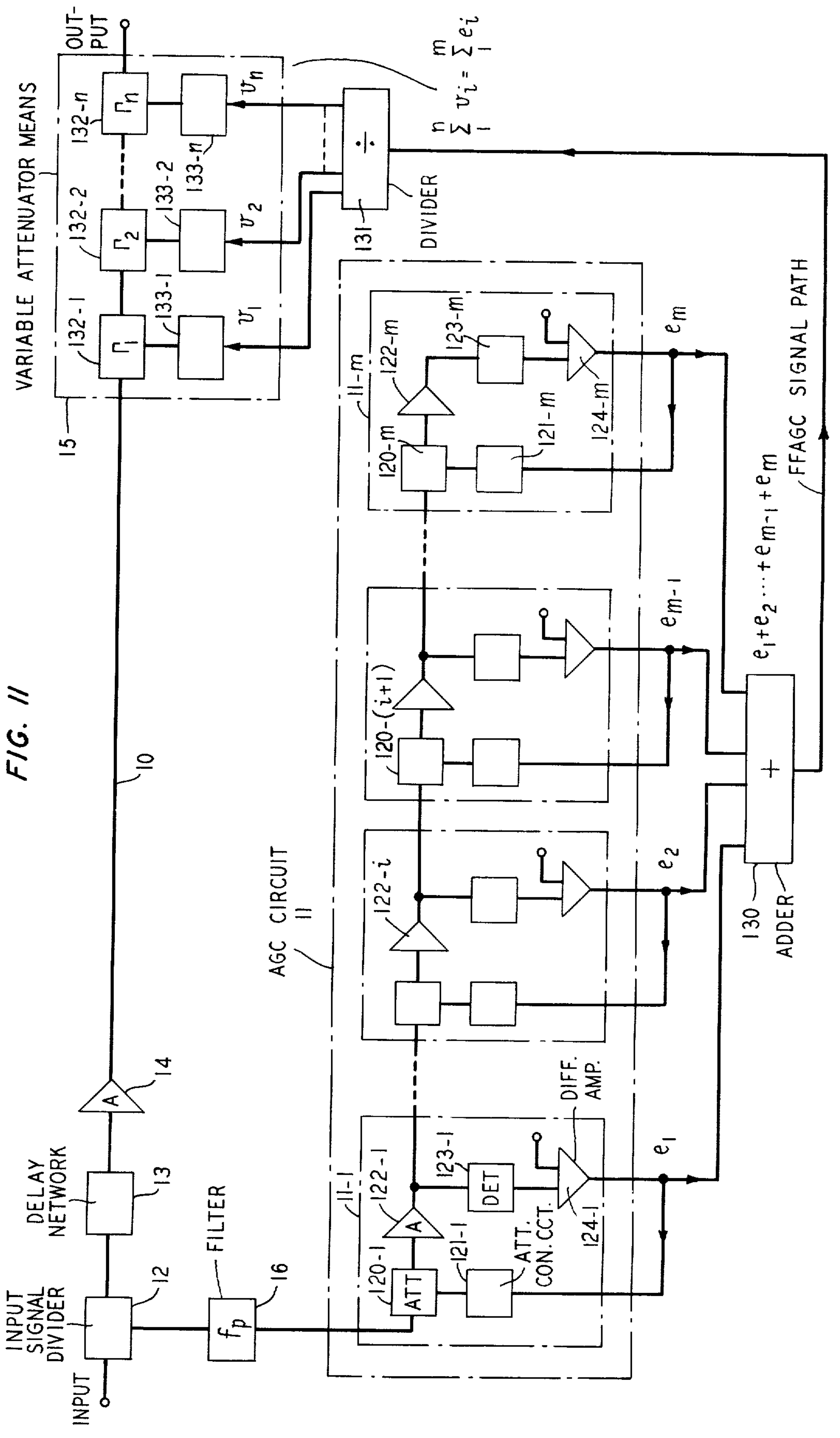
FIG. 11 shows an AGC system incorporating the modification of both FIGS. 9 and 10.

FIG. 11 shows the most generalized AGC control sustem, in accordance with the present invention, incorporating the modification illustrated in both FIGS. 9 and 10. The system comprises a main signal path 10, which typically includes a delay network 13, an amplifier 14 and variable attenuator means 15. The latter, as shown, is made up of a cascade of $n$ attenuators 132-1, 132-2 . . . 132-21, and associated attenuator control circuits 133-1, 133-2 . . . 133-$n$, which, together, form a plurality of linear attenuator means.

The AGC circuit 11 comprises a plurality of $m$ low gain AGC stages arranged as described in connection with FIG. 10. Each stage includes a variable attenuator 120, an attenuator control circuit 121, an amplifier 122, an amplitude detector 123, and a differential amplifier 124. The several stages are cascaded by connecting the output of amplifier 122-i, of the $^{th}$ stage, to the input of attenuator 120-(+1) of the next adjacent stage.

The AGC voltages $e_1$, $e_2$ . . . $e_{m-1}$ and $e_m$, developed by the respective stages are fed back locally to the attenuator control circuit 121 in each stage, and are fed forward to the variable attenuator means 15 through an adder circuit 130, which adds all of the AGC signals to form the sum AGC signal $$\sum_1^m e_i,$$

and a divider circuit 131, which divides the AGC signal into a plurality of $n$ different signals $v_1$, $v_2$ . . . $v_n$, where $$\sum_1^n v_i = \sum_1^m e_i,$$

for application to the $n$ attenuation control circuits 133-1, 133-2 . . . 133-$n$. Since all of the attenuator means in both the AGC circuit and in the main signal path have linear characteristics, the sum of the attenuation through attenuators 120-1 . . . 120-$m$, is equal to the sum of the attenuation through attenuators 132-1 . . . 132-$n$ for the reasons explained hereinabove. Delay networks (not shown) can be included in the feedforward path, as required, for the reasons explained hereinabove.

It will be recognized that the attenuator circuits shown in FIGS. 3 and 4, and the particular attenuator control circuits shown in FIG. 8 as merely illustrative examples of such devices. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An automatic gain control (AGC) system comprising:

a main signal path;

an AGC circuit;

and means for coupling the input end of said AGC circuit to a point along said signal path;

CHARACTERIZED IN THAT:

the AGC signal generated by said AGC circuit is simultaneously fed forward to first variable attenuator means located in said main signal path for controlling the magnitude of the signal propagating therealong, and fed back to a second variable attenuator means located at the input end of said AGC circuit for controlling the magnitude of the signal in the AGC circuit.

2. The AGC system according to claim 1 wherein said first and second attenuator means have identical attenuation -vs- AGC signal characteristics.

3. The AGC system according to claim 1 wherein said first and second attenuator means have linear attenuation in dB -vs- AGC signal characteristics.

4. The AGC system according to claim 1 wherein said AGC circuit includes, in cascade: said second attenuator means; an amplifier; an amplitude detector; and a differential amplifier having one input port coupled to the output port of said detector, and having its second input port coupled to a direct current reference voltage;

and wherein the output signal from said differential amplifier is the AGC signal.

5. The AGC system according to claim 1 wherein each of said first and second variable attenuator means comprises:

a differential amplifier having two input ports;

a transistor having base, emitter and collector electrodes;

and a diode connected between said collector electrode and ground;

means for coupling said emitter electrode to one of the two input ports of said differential amplifier;

the other of said input ports being the port to which the AGC signal is coupled;

means for coupling the output port of said differential amplifier to the transistor base electrode;

a resistor connected between ground and the common junction of said emitter electrode and said one input port;

means for coupling an input signal to said base electrode;

and means for extracting an output signal at the common junction of said collector electrode and said diode.

6. The AGC system according to claim 1 wherein a plurality of different frequency signals and a pilot signal are simultaneously transmitted along said main signal path;

and wherein said AGC circuit includes a narrow passband filter for extracting said pilot signal from among said plurality of signals.

7. The AGC system according to claim 1 wherein each of said first and second variable attenuator means comprises a diode whose alternating current conductance varies in response to said AGC signal;

and wherein said diode serves as a load to the signal whose magnitude is to be controlled.

8. The AGC system according to claim 1 wherein each of said variable attenuator means comprises;

a 3 dB quadrature couplers having two pairs of conjugate ports 1–2 and 3–4, where ports 1 and 2 are the input and output ports, respectively, of said attenuator;

a pair of diodes connected, respectively, to coupler ports 3 and 4 for alternating current signals, and connected in series with respect to direct current signals;

and means for coupling said AGC signal to said series-connected diodes.

9. The AGC system according to claim 8 wherein said means for coupling said AGC signal to the series-connected diodes in each of said variable attenuator means includes an attenuator control circuit whose output current $I_d$ varies as the hyperbolic tangent of said AGC signal.

10. The AGC system according to claim 9 wherein each attenuator control circuit includes:

a differential amplifier comprising a pair of transistors;

and a transconductor whose output current $I_d$ is proportional to the voltage $\Delta v$ produced by said differential amplifier and applied to said transconductor;

said voltage $\Delta v$ being the differential voltage developed between the collector electrodes of said transistors in response to the AGC signal applied to the base electrode of one of said transistors.

11. The AGC system according to claim 10 wherein the emitter electrodes of said pair of transistors are connected to a common current source whose current varies linearly with temperature;

said current source comprising:

a diode having one electrode connected to ground, and the other electrode connected to a source of d.c. current through a first resistor;

a differential amplifier having a pair of input ports;

and a transistor whose collector electrode is connected to the emitter electrodes of the pair of transistors in said attenuator control circuit, and whose emitter electrode is connected to ground through a second resistor;

means for connecting one input port of said differential amplifier to the common junction of said other diode electrode and said first resistor;

means for connecting the other input port of said differential amplifier to the common junction of said emitter electrode and said second resistor;

and means for connecting the output port of said differential amplifier to the base electrode of said transistor.

12. The AGC circuit according to claim 1 wherein said first variable attenuator means, located in said main signal path, comprises a cascade of $n$ identical attenuators, each of which has a linear attenuation in dB -vs- AGC signal characteristic;

wherein said second variable attenuator means has a linear attenuation in dB -vs- AGC signal characteristic;

and wherein the magnitude of the AGC signal coupled to the respective attenuators comprising said first attenuator means is $1/n^{th}$ the magnitude of the AGC signal coupled to said second attenuator means.

13. An automatic gain control (AGC) system comprising:

a main signal path;

an AGC network;

and means for coupling the input end of said AGC network to a point along said main signal path;

CHARACTERIZED IN THAT:

said AGC network comprises a cascade of $m$ AGC circuits, each of one of which generates an AGC signal component $e_1, e_2 \ldots e_m$ which is fed back to a variable attenuator means located at the input end of each of said circuits for controlling the magnitude of the signal in the respective AGC circuits;

and in that said signal components are added together in time coincidence to produce a total AGC signal $y$ which is fed forward to other variable attenuator means located in said main signal path for controlling the magnitude of the signal propagating therealong.

14. The AGC system according to claim 13 wherein each of said AGC circuits includes, in cascade, said variable attenuator means, an amplifier, an amplitude detector, and a differential amplifier having one input port coupled to the output port of said detector, and having a second input port coupled to a direct current reference voltage;

and wherein said circuits are connected in cascade by coupling the amplifier output port of one circuit is coupled to the attenuator means input port of the next adjacent stage.

15. The AGC system according to claim 13 wherein said other attenuator means comprises a cascade of $n$ attenuators;

and wherein said total AGC signal $v$ is divided into $n$ signal components $v_1, v_2 \ldots v_n$, each of which is applied to a different one of said attenuators.

* * * * *